(12) United States Patent
Tanaka et al.

(10) Patent No.: US 6,613,298 B2
(45) Date of Patent: Sep. 2, 2003

(54) TRIVALENT AND TETRAVALENT MIXED VANADIUM COMPOUND PRODUCING METHOD AND VANADIUM ELECTROLYTE PRODUCING METHOD

(75) Inventors: Yasuyuki Tanaka, Tokyo (JP); Ken Horikawa, Tokyo (JP); Muneo Mita, Tokyo (JP); Nobuyuki Tokuda, Osaka (JP); Michiru Kubata, Osaka (JP)

(73) Assignees: Kansai Electric Power Co., Inc., Osaka (JP); Sumitomo Electric Industries, Ltd., Osaka (JP); Nippon Chemical Industrial Co., Ltd., Tokyo (JP)

( * ) Notice: Subject to any disclaimer, the term of this patent is extended or adjusted under 35 U.S.C. 154(b) by 78 days.

(21) Appl. No.: 09/896,105

(22) Filed: Jul. 2, 2001

(65) Prior Publication Data
US 2002/0048546 A1 Apr. 25, 2002

(30) Foreign Application Priority Data
Jul. 4, 2000 (JP) ........................................ 2000-202311

(51) Int. Cl.[7] .............................................. C01G 31/00
(52) U.S. Cl. .......................... 423/62; 423/544; 429/105; 429/205
(58) Field of Search .................. 423/544, 62; 429/105, 429/205

(56) References Cited

U.S. PATENT DOCUMENTS 5,368,762 A * 11/1994 Sato et al. .................... 423/67

FOREIGN PATENT DOCUMENTS

| JP | 60-148068 | | 8/1985 |
| JP | 63-076268 | | 4/1988 |
| JP | 4-286871 | | 10/1992 |
| JP | 6-188005 | | 7/1994 |
| JP | 8-148177 | | 6/1996 |
| JP | 9-180745 | * | 7/1997 |
| JP | 11-067257 | | 3/1999 |

* cited by examiner

Primary Examiner—Steven Bos
(74) Attorney, Agent, or Firm—Armstrong, Westerman & Hattori, LLP

(57) ABSTRACT

The present invention provides method of producing a trivalent and tetravalent mixed vanadium compound having excellent solubility with sulfuric acid directly from a tetravalent or pentavalent vanadium compound by using a reducing agent,and a method of producing a vanadium electrolyte. For example, a vanadium compound mainly containing a pentavalent vanadium compound; sulfur and concentrated sulfuric acid in molar ratios with respect to (one mol of vanadium atom in the pentavalent vanadium compound) 0.35 to 0.4:1.2 to 1.9 are kneaded into paste form, and the paste-form mixture is calcined at a temperature of not less than 150° C. to less than 440° C. so that a trivalent and tetravalent mixed vanadium compound is obtained, and a redox flow battery-use vanadium electrolyte is obtained by dissolving the trivalent and tetravalent mixed vanadium compound in a sulfuric acid solution.

6 Claims, No Drawings

TRIVALENT AND TETRAVALENT MIXED VANADIUM COMPOUND PRODUCING METHOD AND VANADIUM ELECTROLYTE PRODUCING METHOD

BACKGROUND OF THE INVENTION

1. Field of the Invention

This invention relates to a method of producing trivalent and tetravalent mixed vanadium compounds to be used as a redox flowbattery-use electrolyte and a method of producing a vanadium electrolyte.

2. Description of the Related Art

Demand for electric power in Japan increases continuously year after year, but a fluctuation in the demand for electric power also tends to become remarkable according to heightening of the industrial structure and an improvement in national living standard. For example, when an amount of the daytime demand for the electric power in summer is assumed to be 100, it is not more than 30 at dawn under the present conditions. Meanwhile, from the viewpoint of the supply of electric power, percentages of nuclear plants and new thermal power stations whose fluctuations in outputs are not desirable tend to increase, and thus the necessity of facilities for storing electric power is heightened. The current storage of electric power is executed by pumping power generation, but their site conditions become gradually severe. Because of these circumstances, various secondary batteries are being studied as a method of storing electric power as energy which does not cause environmental pollution and has high versatility. But in them, attention is paid to a redox flow secondary battery which is constituted so that two kinds of redox agents are brought into contact via a diaphragm.

The redox flow secondary battery is such that two kinds of aqueous solutions (electrolyte) of metallic ions whose oxidation number changes are prepared and they are stored as a positive electrode solution and a negative electrode solution in separate tanks, and the positive electrode solution and the negative electrode solution are supplied to a circulation type electrolytic cell having electrolytic cells of a structure such that the two kinds of electrolytes contact via a diaphragm by a pump, and the oxidation number of the metallic ions increases in one electrolytic cell and the oxidation number of the metallic ions decreases in the other electrolytic cell so that charging and discharging take place.

As the technique relating to such a redox flow battery, conventionally there are typically suggested techniques using an iron-chromium hydrochloric acid solution as an electrolyte (for example, Japanese Patent Application Laid-Open No. 60-148068 (1985), Japanese Patent Application Laid-Open No. 63-76268(1988)), and techniques using vanadium sulfate solution as an electrolyte (for example, Japanese Patent Application Laid-Open No. 4-286871 (1992), Japanese Patent Application Laid-Open No. 6-188005(1994)). However, as for an iron-chromium redox flow battery, preparation of an electrolyte is restricted from the viewpoint of mixing and solubility of electrolyte, and an output voltage is about 1 V, namely, an energy density is low. Further, there arise problems that a charging state between the positive electrode solution and the negative electrode solution becomes imbalanced, that chlorine gas is possibly generated from the positive electrode at the time of charging and the like.

On the contrary, as for the vanadium redox flow battery, its output voltage is 1.4 V, namely, high, and thus this battery has high efficiency and high energy density. For this reason, in recent years, development of a vanadium redox flow battery is particularly desired. The electrolyte of the redox flow battery is prepared in such a manner that tetravalent vanadium electrolyte is put into the positive electrode solution cell and trivalent vanadium electrolyte is put into the negative electrode solution cell. As for the state of the electrolyte at the time of charging and discharging, in charging, the tetravalent vanadium in the positive electrode solution is changed into pentavalent vanadium and the trivalent vanadium in the negative electrode solution is changed into bivalent vanadium. At the time when the electrolytes in the positive electrode and negative electrode solution cells are changed respectively into the pentavalent vanadium and the bivalent vanadium electrolytes, discharging starts to take place. Normally, as for the electrolyte, the tetravalent vanadium electrolyte is used for the positive electrode solution and the trivalent vanadium electrolyte is used for the negative electrode solution, but the positive electrode solution and the negative electrode solution may be mixed solution of tetravalent vanadium and trivalent vanadium in which their amounts are equal. Further, it is known that the positive electrode solution may be a mixed solution of tetravalent vanadium and trivalent vanadium in 2:1 proportion, and the negative electrode solution may be a mixed liquid of tetravalent vanadium and trivalent vanadium in 1:2 proportion.

In these solutions, since the solution of tetravalent vanadium and trivalent vanadium in 1:1 proportion can be directly used for the positive electrode solution and the negative electrode solution simultaneously, if the mixed vanadium containing tetravalent vanadium and trivalent vanadium in 1:1 proportion can be produced industrially and advantageously, industrial utility value is heightened. As such a method of producing a trivalent and tetravalent mixed vanadium compound, there suggest a method of producing a tetravalent and trivalent mixed electrolyte in such a manner that a vanadium compound is dissolved in a solvent under a condition of alkali or neutrality, vanadium ions are heated and polymerized under a condition of acidity so that polyvanadium oxide compound is separated, a part of the polyvanadium oxide compound is calcined in an atmosphere of inert gas or oxidation so that ammonium is removed, at least another part of the polyvanadium oxide compound is processed in an atmosphere of a reducing gas so that a trivalent vanadium compound is generated, vanadium pentoxide from the ammonia removing step is mixed and made to react with one part of the trivalent vanadium solution (Japanese Patent Application Laid-Open No. 08-148177 (1996)), a method of producing a trivalent and tetravalent vanadium electrolyte in such a manner that a reducing operation is performed on a compound containing pentavalent vanadium so that a vanadium compound with valence lower than pentavalent in which a heating peak of reoxidation is not more than 600° C. when this peak is measured by differential thermogravimetric analysis under airflow is generated, and an obtained reductant is mixed with the compound containing pentavalent vanadium so that the mixture is dissolved in a sulfuric acid solution (Japanese Patent Application Laid-Open No. 11-67257(1999)), and the like.

However, the above methods of producing the trivalent and tetravalent mixed vanadium are a method of producing vanadium pentoxide and trivalent vanadium separately from a starting material, mixing them in desired proportion, and obtaining trivalent and tetravalent mixed vanadium. Furthermore, since the vanadium compound which is dissolved in sulfuric acid is vanadium oxide, solubility with sulfuric acid tends to be deteriorated.

Therefore, it is an object of the present invention to provide a method of producing trivalent and tetravalent mixed vanadium compound having excellent solubility with sulfuric acid directly from tetravalent or pentavalent vanadium compound by using a reducing agent, and a method of producing a vanadium electrolyte.

SUMMARY OF THE INVENTION

In the above circumstances, as a result of enthusiastic examination by the inventors, it was found that a tetravalent or pentavalent vanadium compound, sulfur and concentrated sulfuric acid were kneaded in specified molar ratio into paste form, and the paste-form mixture was heated to a predetermined temperature so that a trivalent and tetravalent mixed vanadium compound could be produced directly from the tetravalent or pentavalent vanadium compound. In such a manner, the present invention was completed.

Namely, the present invention provides a trivalent and tetravalent mixed vanadium compound producing method of kneading a tetravalent or pentavalent vanadium compound, sulfur and concentrated sulfuric acid into a paste form and calcining the paste-form mixture at a temperature of not less than 150° C. to less than 440° C., characterized in that in the case where the vanadium compound is a tetravalent vanadium compound, the sulfur and the concentrated sulfuric acid are blended in molar ratio 0.1–0.15:1.2–1.9 with respect to vanadium atoms in the tetravalent vanadium compound, and in the case where the vanadium compound is a pentavalent vanadium compound, the sulfur and the concentrated sulfuric acid are blended in molar ratio 0.35–0.4:1.2–1.9 with respect to vanadium atoms of 1 mol in the pentavalent vanadium compound.

In addition, the present invention provides a vanadium electrolyte producing method, characterized in that a calcined matter of the trivalent and tetravalent mixed vanadium compound is directly dissolved or cooled so as to be dissolved in a sulfuric acid solution.

DETAILED DESCRIPTION OF THE PREFERRED EMBODIMENTS

In the method of producing a trivalent and tetravalent mixed vanadium compound according to the present invention, a tetravalent or pentavalent vanadium compound as a material means a tetravalent vanadium compound or pentavalent vanadium compound and does not include a tetravalent and pentavalent mixed vanadium compound. However, in the case where the material is a tetravalent vanadium compound, a compound containing the tetravalent vanadium compound with purity of not less than 95 weight %, and more preferably not less than 98 weight % can be used, and the rest part of the compound may be a pentavalent vanadium compound, for example. Moreover, in the case where the material is a pentavalent vanadium compound, the compound containing the pentavalent vanadium compound with purity of not less than 95 weight %, and preferably not less than 98 weight % can be used, and the rest part of the compound may be a tetravalent vanadium compound, for example. The tetravalent vanadium compound is not particularly limited, but examples are vanadyl sulfate (VOSO$_4$; tetravalent), vanadium dioxide (VO$_2$; tetravalent) and the like. Moreover, the pentavalent vanadium compound is not particularly limited, but since vanadium pentoxide, for example, can be easily obtained industrially, it is used preferably. Moreover, a vanadium compound is not limited as long as it can be obtained industrially, and vanadium pentoxide obtained from vanadium ore, vanadium pentoxide obtained from ash of a dust collector when fossil fuel is burned, or the like may be used. Examples of the ash of a dust collector when fossil fuel is burned are heavy oil, tar, asphalt, lime, or fuel obtained by emulsionizing them, and matters obtained when orimulsion or the like is burned.

Examples of sulfur are powder sulfur, flake sulfur and block-state sulfur, one or more kinds of them are combined to be capable of being used. The sulfur is used for reducing vanadium. As concentrated sulfuric acid, sulfuric acid of not less than 95% which does not contain moisture is normally used. The concentrated sulfuric acid reacts with vanadium so as to generate vanadium sulfate.

The blending proportion of vanadium compound, sulfur and concentrated sulfuric acid is such that in the case where the vanadium compound is a tetravalent vanadium compound, the sulfur is 0.1 to 0.15 and the concentrated sulfuric acid is 1.2 to 1.9 in molar ratio with respect to vanadium atoms of the tetravalent vanadium compound. Meanwhile, in the case where the vanadium compound is a pentavalent vanadium compound, the sulfur is 0.35 to 0.4 and the concentrated sulfuric acid is 1.2 to 1.9 in molar ratio with respect to vanadium atoms of the pentavalent vanadium compound. In the present invention, the blending proportion of obtained trivalent and tetravalent mixed vanadium compound can be set arbitrarily within a range of this blending molar ratio, namely, in order to heighten the generating percentage of the trivalent vanadium compound in the mixture, the blending proportion of sulfur and concentrated sulfuric acid may be heightened in the range of this molar ratio. Normally, the reaction materials are made to react in the range of the molar ratio so that a trivalent and tetravalent mixed vanadium compound whose $V^{4+}/V^{3+}$ molar ratio is 0.65 to 1.5 can be produced. The reason that an amount of sulfur is within the above range is as following. When an amount of sulfur is smaller than the above range, trivalent vanadium sulfate is not generated, and when the amount is larger than the above range, a part of the sulfur is consumed as sulfur dioxide uselessly or remains in a calcined matter, that is not preferable. The reason that an amount of the concentrated sulfuric acid is in the above range as following. When the amount is smaller than the above range, a tetravalent vanadium compound or a pentavalent vanadium compound as the material remains in the calcined matter, whereas when the amount is larger than the above range, an amount of residual sulfuric acid in the calcined matter becomes larger, that is not economical and thus is not preferable.

In addition, in the case where the trivalent and tetravalent mixed vanadium compound of the present invention is further mixed with a sulfate solution so as to be used as a redox flow vanadium battery-use electrolyte, a blending amount of the sulfur and concentrated sulfuric acid is such that in the case where the vanadium compound is a tetravalent vanadium compound, the sulfur is about 0.125 and the concentrated sulfuric acid is about 1.55 in molar ratio with respect to vanadium atoms in the tetravalent vanadium compound, whereas in the case where the vanadium compound is a pentavalent vanadium compound, the sulfur is about 0.375 and the concentrated sulfuric acid is about 1.55 in molar ratio with respect to vanadium atoms in the pentavalent vanadium compound. As a result, it is preferable because the trivalent vanadium sulfate and tetravalent vanadium sulfate are obtained as $V^{3+}$ and $V^{4+}$ in approximately equal amount.

As a method of kneading the tetravalent vanadium compound or the pentavalent vanadium compound, sulfur and concentrated sulfuric acid into a paste form, there is a kneading method using mixers such as a Nauta Mixer(R), a paddle mixer and a kneader mixer. The kneading time is not particularly limited, but for example, 10 to 60 minutes. Here, the paste form represents a state that a knead matter has considerable viscosity, and is concept containing a block state. In the present invention, the mixture of the vanadium compound, sulfur and concentrated sulfuric acid is made to the paste form so that the reaction takes place uniformly.

After the kneading is completed, the paste-form mixture is heated in a calcining oven at not less than 150° C. to less than 440° C., preferably not less than 180° C. to less than 350° C., more preferably not less than 200° C. to less than 300° C. When the calcining temperature is within the above range, it is preferable because the reducing reaction takes place smoothly and a decomposing amount of sulfuric acid is small. The calcining time is 30 minutes to 24 hours, preferably 2 to 5 hours. When the calcining time is within the above range, it is preferable because reducing is executed sufficiently. Examples of the calcining oven are a tunnel kiln, a ring kiln and a rotary kiln. After the completion of the calcining, the objective trivalent and tetravalent mixed vanadium compound is obtained directly from the calcined matter or by cooling the calcined matter.

The trivalent and tetravalent mixed vanadium compound obtained in the present invention is composed of $V_2(SO_4)_3$ as the trivalent vanadium compound and $VOSO_4$ as the tetravalent vanadium compound. For this reason, this trivalent and tetravalent mixed vanadium compound powder has excellent solubility with a sulfuric acid solution and further has solubility such that solubilization retardant and non-soluble residues are normally not more than 2 weight %, preferably not more than 1 weight %.

The trivalent and tetravalent mixed vanadium compound obtained in the above manner is further dissolved in a sulfate solution so as to be capable of being used as a redox flow battery-use vanadium electrolyte. The vanadium electrolyte is prepared so that vanadium ion density of the trivalent and tetravalent mixed vanadium compound obtained in the above manner is normally 1 to 5 mol/L, preferably 1 to 2 mol/L, and sulfate ion density is normally 4 to 8 mol/L, preferably 4 to 5 mol/L. More concretely, the trivalent and tetravalent mixed vanadium compound, the sulfate solution and water if desired are blended so that the above range is obtained, and they are dissolved at a temperature of normally 60° C. to a boiling point, preferably 80 to 100° C., by agitating them for normally not less than 0.5 hour, preferably 1.5 to 3 hours.

One kind or more kinds of another additives such as nitrate including potassium, rubidium and ammonium, phosphate and oxalate can be added to the vanadium electrolyte.

In addition, in the present invention, the redox flow battery is well known, and this battery is such that two kinds of metallic ion aqueous solutions (electrolytes) whose oxidation number changes are prepared and are stored as a positive electrode solution or a negative electrode solution in separate cells, and the positive electrode solution and the negative electrode solution are supplied by a pump to a circulation type electrolytic cell having two cells where that two kinds of electrolytes contact via a diaphragm, and a oxidation number of metallic ions becomes large in one electrolytic cell and an oxidation number of metallic ions becomes small in the other electrolytic cell so that charging and discharging take place. The vanadium electrolyte of the present invention can be used directly as the redox flow battery-use electrolyte for positive electrode solution and negative electrode solution simultaneously.

Next, there will be concretely explained embodiments of the present invention, but they are simply examples and thus do not limit the present invention.

PRODUCTION EXAMPLE 1

Orimulsion ash of 100 g having a composition shown in Table 1 discharged from a thermal power station was calcined in an electric oven at 440° C. for 24 hours, and the calcined matter was rinsed with water so that a soluble component was removed, and residue was dried. A weight of the dried matter was 4.4 g, and when it was subject to X-ray diffraction, it was confirmed that the dried matter was a pentavalent vanadium compound $V_2O_5$. Quality levels of the obtained $V_2O_5$ are shown in Table 2. Here, in Table 1 and Table 2, numerical values are represented by weight %.

TABLE 1

| V | S | $NH_4$ | Ni | Fe | Mg | C |
|---|---|---|---|---|---|---|
| 2.3 | 24 | 19 | 0.6 | 0.1 | 3.0 | 1.0 |

TABLE 2

| V | S | Ni | Fe | Mg |
|---|---|---|---|---|
| 52.7 | 0.1 | 0.2 | 1.3 | 0.1 |

Embodiment 1

The pentavalent vanadium compound $V_2O_5$ obtained in the production example 1 of 19.4 g, sulfur of 3.2 g and concentrated sulfuric acid of 31 g were mixed for about 10 minutes. The mixture was of paste form. The paste-form mixture was calcined in an electric oven at 300° C. for 1 hour. A weight of the calcined matter was 36.8 g (yield as V: 100%). When the calcined matter was analyzed quantitatively according to X-ray diffraction and a potential difference titration method, the calcined matter was a mixture of a trivalent vanadium compound $V_2(SO_4)_3$ and a tetravalent vanadium compound $VOSO_4$, and it was confirmed that this mixture contains $V^{3+}$ of 0.103 mol and $V^{4+}$ of 0.097 mol. Its quality levels are shown in Table 3. Here, in Table 3, numerical values are represented by weight %.

TABLE 3

| V | S | Ni | Fe | Mg |
|---|---|---|---|---|
| 28.3 | 22.6 | 0.001 | 0.3 | 0.03 |

Embodiment 2

Vanadium pentoxide ($V_2O_5$ purity: not less than 99%) on the market of 18.4 g, sulfur of 3.2 g and concentrated sulfuric acid of 31 g were mixed for about 10 minutes. The mixture was of paste form. The paste-form mixture was calcined in an electric oven at 300° C. for 1 hour. A weight of the calcined matter was 36.2 g (yield as V: 100%). When the calcined matter was analyzed quantitatively according to X-ray diffraction and a potential difference titration method, it was confirmed that the calcined matter was a mixture of a trivalent vanadium compound $V_2(SO_4)$ and a tetravalent vanadium compound $VOSO_4$, and this mixture contains $V^{3+}$ of 0.105 mol and $V^{4+}$ of 0.095 mol. Its quality levels are shown in Table 4. Here, in Table 4, numerical values are represented by weight %.

TABLE 4

| V | S | Ni | Fe | Mg |
|---|---|---|---|---|
| 28.4 | 22.5 | ND | 0.002 | ND |

Comparative Example 1

Vanadium pentoxide ($V_2O_5$ purity: not less than 99%) on the market of 18.4 g, sulfur of 3.2 g and concentrated sulfuric acid of 31 g were mixed for about 10 minutes. The mixture was of paste form. The paste-form mixture was calcined in an electric oven at 130° C. for 3 hours. A weight of the calcined matter was 34.4 g (yield as V: 100%). When the calcined matter was analyzed quantitatively according to X-ray diffraction and a potential difference titration method, it was confirmed that the calcined matter was a mixture of a tetravalent vanadium compound $VOSO_4$ and a pentavalent vanadium compound. Its quality levels are shown in Table 5. Here, in Table 5, numerical values are represented by weight %.

TABLE 5

| $V^{5+}$ | $V^{4+}$ | S | Ni | Fe | Mg |
|---|---|---|---|---|---|
| 1.6 | 28.1 | 22.4 | ND | 0.001 | ND |

Embodiment 3

The trivalent and tetravalent mixed vanadium compound obtained in the embodiment 2 of 36.2 g, 98% concentrated sulfuric acid of 15 g and water of 100 ml were added, and the trivalent and tetravalent mixed vanadium compound was dissolved sufficiently while agitation at 100° C. for 3 hours. A dissolution rate of the vanadium compound of the obtained solution was 99.5%. The dissolution rate was obtained in percentage in such a manner that the dissolved vanadium compound and an insoluble matter were analyzed, and an amount of vanadium metal (g) in the dissolved vanadium compound was divided by an amount of vanadium metal (g) in the added trivalent and tetravalent mixed vanadium compound.

Embodiment 4

(Preparation of Electrolyte)

The sulfate solution of the trivalent and tetravalent mixed vanadium compound obtained in embodiment 3 was used directly as a positive electrode solution and a negative electrode solution.

(Measurement of Charging/Discharging Properties)

A small redox flow battery having the following specification was assembled by using the prepared negative electrode and positive electrode electrolytes, and the charging/discharging properties were checked. The results of the charging/discharging properties are shown in Table 6. However, a battery capacity is a value with current density of 60 mA/cm² and a temperature of 28° C.

Specification of the small battery

Area of electrode: 500 cm²

Electrode: carbon fiber cloth

Diaphragm: anion exchange film

Dipole plate: carbon plate

Material of tank and tube: rigid PVC resin

Tank capacity: 5 lit. for both positive electrode electrolyte and negative electrode electrolyte

TABLE 6

| Current efficiency | 99.2% |
|---|---|
| Voltage efficiency | 85.2% |
| Energy efficiency | 84.5% |
| Battery capacity | 120 WH |

According to the method of producing the trivalent and tetravalent mixed vanadium compound of the present invention, tetravalent or pentavalent vanadium compound, sulfur and concentrated sulfuric acid are kneaded in a predetermined proportion so as to be in a paste form, and the paste-form mixture is simply heated to a predetermined temperature so that the trivalent and tetravalent mixed vanadium compound in which $V^{4+}/V^{3+}$ molar ratio is 0.65 to 1.5 can be produced directly from the tetravalent or pentavalent vanadium compound at low cost. The obtained trivalent and tetravalent mixed vanadium compound shows excellent solubility with a sulfuric acid solution. Moreover, the trivalent and tetravalent mixed vanadium compound obtained by this method is dissolved in a sulfuric acid solution so as to be capable of being used as vanadium electrolyte of positive electrode solution and negative electrode solution. A redox flow battery using the above electrolyte has excellent battery performance.

What is claimed is:

1. A trivalent and tetravalent mixed vanadium compound producing method of kneading a tetravalent or pentavalent vanadium compound, sulfur and concentrated sulfuric acid into a paste form and calcining the paste-form mixture at a temperature of not less than 150° C. to less than 440° C., wherein in the case where the vanadium compound is a tetravalent vanadium compound, the sulfur and the concentrated sulfuric acid are blended in molar ratio 0.1–0.15:1.2–1.9 with respect to vanadium atoms in the tetravalent vanadium compound, and in the case where the vanadium compound is a pentavalent vanadium compound, the sulfur and the concentrated sulfuric acid are blended in molar ratio 0.35–0.4:1.2–1.9 with respect to vanadium atoms in the pentavalent vanadium compound.

2. The trivalent and tetravalent mixed vanadium compound producing method according to claim 1, wherein the tetravalent or pentavalent vanadium compound is vanadium dioxide, vanadyl sulfate or vanadium pentoxide.

3. The trivalent and tetravalent mixed vanadium compound producing method according to claim 1 or 2, wherein the trivalent and tetravalent mixed vanadium compound is constituted so that the trivalent vanadium compound is $V_2(SO_4)_3$ and the tetravalent vanadium compound is $VOSO_4$.

4. The trivalent and tetravalent mixed vanadium compound producing method according to claim 1 or 2, wherein $V^{4+}/V^{3+}$ molar ratio in the trivalent and tetravalent mixed vanadium compound is 0.65 to 1.5.

5. The trivalent and tetravalent mixed vanadium compound producing method according to claim 1 or 2, wherein the trivalent and tetravalent mixed vanadium compound contains $V^{3+}$ and $V^{4+}$ whose amounts are equal to each other.

6. A vanadium electrolyte producing method, wherein a calcined matter of the trivalent and tetravalent mixed vanadium compound according to claim 1 or 2 is directly dissolved in a sulfuric acid solution or cooled and then dissolved in a sulfuric acid solution.

* * * * *